United States Patent
Ludewig et al.

(10) Patent No.: US 7,966,536 B2
(45) Date of Patent: Jun. 21, 2011

(54) METHOD AND APPARATUS FOR AUTOMATIC SCAN COMPLETION IN THE EVENT OF A SYSTEM CHECKSTOP

(75) Inventors: Ralf Ludewig, Schoenaich (DE); Walter Niklaus, Jettingen (DE); Dietmar Schmunkamp, Schoenaich (DE); Scott Barnett Swaney, Germantown, NY (US); Tobias Webel, Schwaebisch Gmuend (DE)

(73) Assignee: International Business Machines Corporation, Armonk, NY (US)

(*) Notice: Subject to any disclaimer, the term of this patent is extended or adjusted under 35 U.S.C. 154(b) by 475 days.

(21) Appl. No.: 12/101,208

(22) Filed: Apr. 11, 2008

(65) Prior Publication Data
US 2009/0259899 A1    Oct. 15, 2009

(51) Int. Cl.
*G01R 31/28* (2006.01)
*G06F 11/00* (2006.01)

(52) U.S. Cl. ............. 714/729; 714/25; 714/30; 714/34; 714/727

(58) Field of Classification Search .................. 714/25, 714/30, 34, 727, 729
See application file for complete search history.

(56) References Cited

U.S. PATENT DOCUMENTS

| | | | | |
|---|---|---|---|---|
| 5,954,825 A * | 9/1999 | Kaiser et al. | ..................... | 714/43 |
| 6,189,112 B1 * | 2/2001 | Slegel et al. | ..................... | 714/10 |
| 6,502,208 B1 * | 12/2002 | McLaughlin et al. | .......... | 714/25 |
| 6,625,749 B1 * | 9/2003 | Quach | ............................. | 714/10 |
| 7,111,196 B2 * | 9/2006 | Balazich et al. | ................ | 714/13 |
| 7,461,309 B2 * | 12/2008 | Kiryu | ............................ | 714/729 |
| 7,467,325 B2 * | 12/2008 | Eisen et al. | ..................... | 714/10 |
| 7,475,311 B2 * | 1/2009 | Kiryu | ............................. | 714/732 |
| 7,568,138 B2 * | 7/2009 | Martens et al. | ................ | 714/726 |
| 7,743,306 B2 * | 6/2010 | Wen et al. | ...................... | 714/739 |
| 2003/0115525 A1 | 6/2003 | Hill et al. | | |
| 2005/0138509 A1 * | 6/2005 | Kiryu et al. | ................... | 714/726 |
| 2007/0011537 A1 * | 1/2007 | Kiryu | ............................. | 714/733 |
| 2007/0255997 A1 | 11/2007 | Xiao et al. | | |
| 2008/0235454 A1 * | 9/2008 | Duron et al. | .................. | 711/128 |
| 2008/0235543 A1 * | 9/2008 | Wen et al. | ...................... | 714/724 |
| 2009/0083593 A1 * | 3/2009 | Wen et al. | ...................... | 714/726 |
| 2009/0319842 A1 * | 12/2009 | Wen et al. | ...................... | 714/738 |

OTHER PUBLICATIONS

Pyron et al., DFT Advances in Motorola's MPC7400, a PowerPC Microprocessor, 1999, IEEE, pp. 137-146.*
Riley et al., Debug of the Cell Processor: Moving the Lab into Silicon, 2006, IEEE, pp. 1-9.*
Riley et al., Cell Broadband Engine Debugging for Unknown Events, Sep. 2007, IEEE, pp. 486-493.*

* cited by examiner

*Primary Examiner* — John J Tabone, Jr.
(74) *Attorney, Agent, or Firm* — Schmeiser, Olsen & Watts; Randall Bluestone

(57) ABSTRACT

A method for automatic scan completion in the event of a system checkstop in a processor. The processor includes: a processor register; a millicode interface connected between the processor register and a checkstop scan controller; a checkstop logic circuit connected between the checkstop scan controller and a checkstop scan engine; and a scan chain engine and a scan chain connected to the checkstop scan engine. The method includes (a) upon occurrence of a checkstop serially reading data from a processor register and serially writing the data to latches of a scan chain register; and (b) upon occurrence of a system checkstop during (a), stopping the reading and writing and moving data sent before the system checkstop from latches of the scan chain where the data was stored when the system checkstop occurred to latches where the data would have been stored if the system checkstop had not occurred.

20 Claims, 3 Drawing Sheets

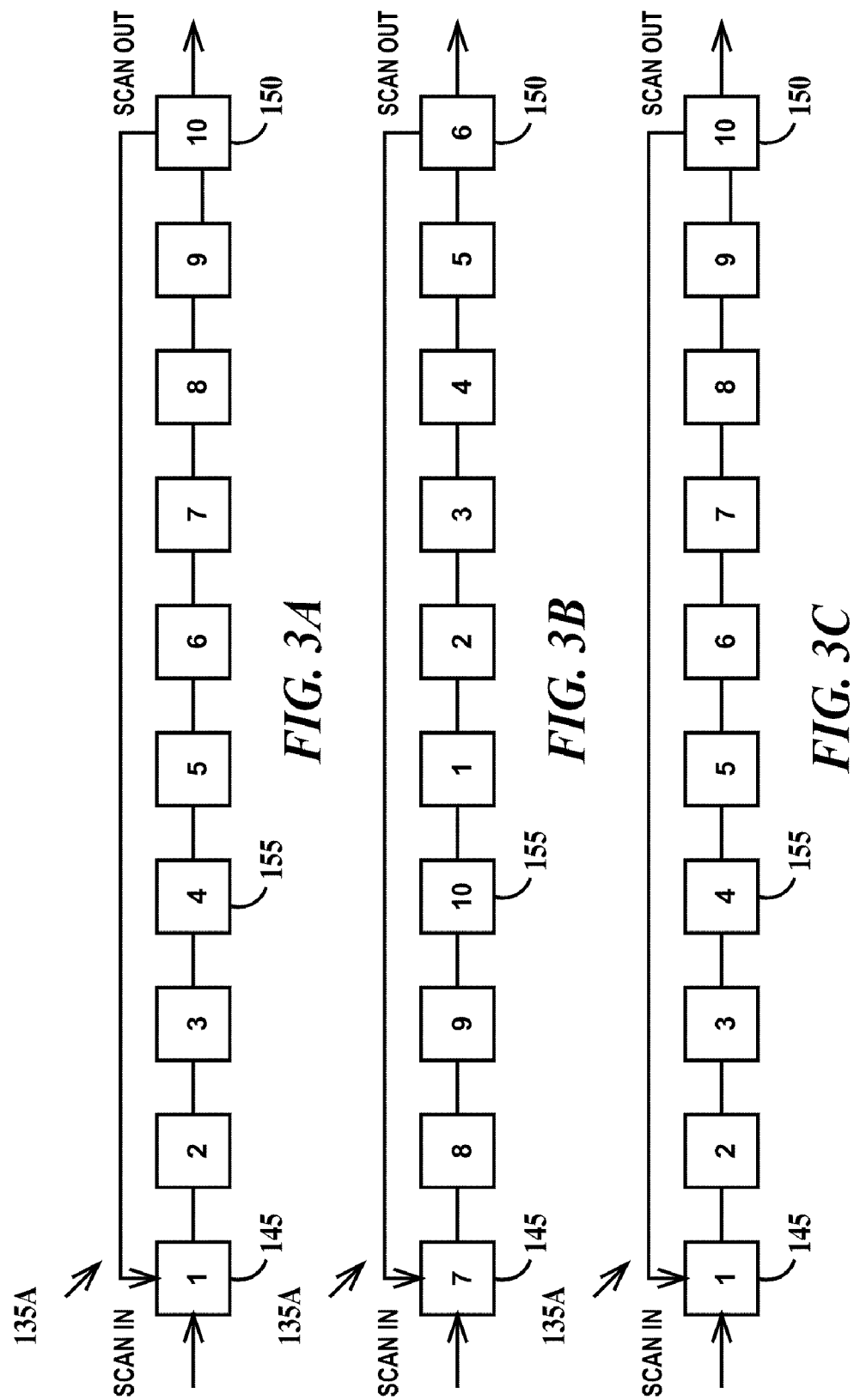

METHOD AND APPARATUS FOR AUTOMATIC SCAN COMPLETION IN THE EVENT OF A SYSTEM CHECKSTOP

FIELD OF THE INVENTION

The present invention relates to fault recovery in processor systems; more specifically, it relates to a method and apparatus for automatic scan completion in the event of a checkstop error.

BACKGROUND OF THE INVENTION

When a processing error occurs (called a checkstop), the data in various registers of a processor which are connected in a scan chain are scanned out in order to diagnose and recover from the error. Diagnosis is typically handled by an external service element while recovery is handled by a so far unused processor (spare processor). When an error occurs, error recovery code (implemented in millicode running on a millicode interface) extracts the data from the registers by using the scan chains in efforts to minimize the impact of the hardware failure to the operating system and the applications. If the error recovery code is interrupted in the middle of a checkstop scan by an event that leads to a system checkstop where the millicode interface is shut down, the scan chains will only be partially rotated and error recovery will be difficult or impossible. Accordingly, there exists a need in the art to overcome the deficiencies and limitations described hereinabove.

SUMMARY OF THE INVENTION

A first aspect of the present invention is a processor, comprising: a processor register; a millicode interface connected between the processor register and a checkstop scan controller; a checkstop logic circuit connected between the checkstop scan controller and a checkstop scan engine; and a scan chain engine and a scan chain connected to the checkstop scan engine.

A second aspect of the present invention is a method of automatic scan completion in the event of a system checkstop, the method comprising: (a) upon occurrence of a checkstop, serially reading data from a processor register and serially writing the data to latches of a scan chain register; and (b) upon occurrence of a system checkstop during (a), stopping the reading and writing and moving data sent before the system checkstop from latches of the scan chain where the data was stored when the system checkstop occurred to latches where the data would have been stored if the system checkstop had not occurred.

A third aspect of the present invention is a method, comprising: providing a processor, the processor comprising: a process register; a millicode interface connected between the process register and a checkstop scan controller, the checkstop scan controller coupled to checkstop scan engine; and a scan chain engine and a scan chain connected to the checkstop scan engine; and connecting a checkstop logic circuit between the checkstop scan controller and a checkstop scan engine.

BRIEF DESCRIPTION OF THE DRAWINGS

The features of the invention are set forth in the appended claims. The invention itself, however, will be best understood by reference to the following detailed description of an illustrative embodiment when read in conjunction with the accompanying drawings, wherein:

FIGS. 3A, 3B and 3C illustrate a sequence of scan rotation according to the embodiments of the present invention.

DETAILED DESCRIPTION OF THE INVENTION

A checkstop is defined as the stoppage of instruction processing (including stoppage to responses to interrupts) by a processor as a result of a hardware failure. In one example, the hardware failing is the processor itself. A system check stop, as distinct from a simple checkstop is defined as a response to an error resulting in shutdown of the clock to the entire system.

Millicode instructions (software) implement complex instructions in hardware.

Examples of millicode-implemented instructions include but are not limited to start interpretive execution, cross-memory instructions, interruption handlers, resets and reliability, availability and serviceability features. Millicode resides in a protected area of storage called the hardware system area, which is not accessible to the normal operating system or application program. One example of a code implemented in millicode is Dynamic Processor Sparing Code which extracts data from the processor registers and passes the data to a spare processor by using the scan chains in response to a checkstop in an effort to minimize the impact of a hardware failure on the operating system and applications.

Figure 1:
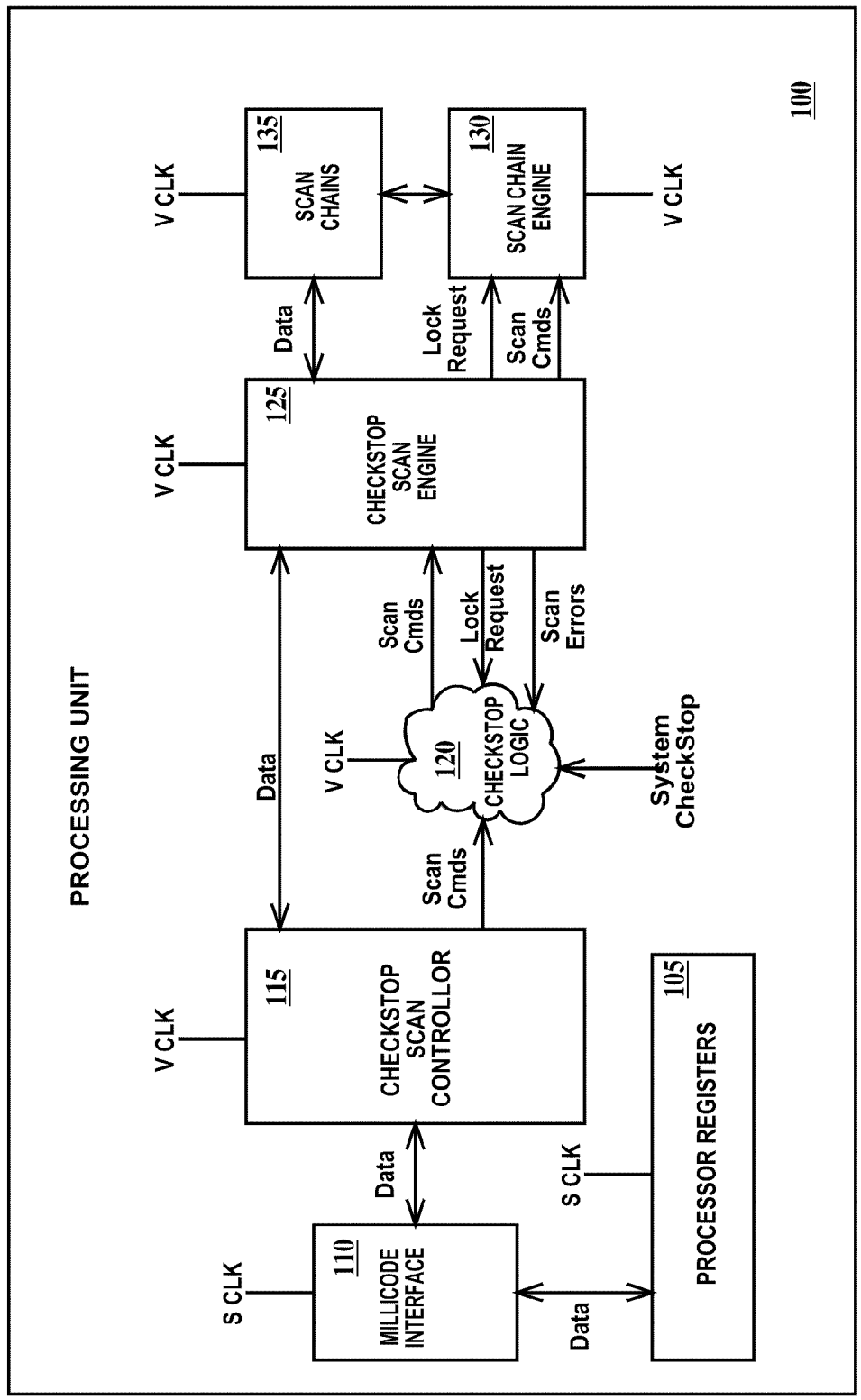
FIG. 1 is a schematic representation of a portions of a processor according to embodiments of the present invention.

FIG. 1 is a schematic representation of a portions of a processor according to embodiments of the present invention. In FIG. 1, a processing unit 100 (or processing core of a multiprocessor unit) includes processor registers 105, a millicode interface 110, a checkstop scan controller 115, a checkstop logic circuit 120, a checkstop scan engine 125, a scan chain engine 130 and scan chains 135. Other processor 100 circuits such as instruction processors, arithmetic logic and floating point units, interface circuits, memory units, and circuits implementing other processor functions as known in the art are not illustrated in FIG. 1. Processor registers 105 and millicode interface 110 are clocked by a system clock S CLK. Checkstop scan controller 115, checkstop logic circuit 120, checkstop scan engine 125, scan chain engine 130 and scan chains 135 are clocked by a vital clock V CLK. During a checkstop both the S CLK and V CLK are running. During a system checkstop only the S-CLK is stopped, but the V CLK is still running. The S CLK and V CLK are synchronous.

Millicode interface 100 is connected between processor registers 105 and checkstop scan controller 115. Millicode interface 110 runs millicode that, among the other actions described supra, transfers data from processor registers 105 to checkstop scan controller 115 in the event of a checkstop. Checkstop logic circuit 120 is connected between checkstop scan controller 115 and checkstop scan engine 125. Scan commands from checkstop controller 115 are passed to checkstop logic circuit 120, which, in the case of a checkstop are passed to checkstop scan engine 125. In the case of a system checkstop during a checkstop, new scan command are generated by the finite state machine encoded in checkstop logic circuit 120 and the new scan commands are passed to checkstop engine 125. Checkstop scan engine 125 executes the scan commands or new scan commands. Data is passed directly between checkstop scan controller 115 and checkstop scan engine 125. Checkstop scan engine 125 is connected to scan chain engine 130 and scan chains 135. Checkstop scan engine 125 passes data and between scan chains 135 and checkstop scan controller 115 and lock requests (see infra) between checkstop logic circuit 120 and scan chain engine 130. Checkstop scan engine 125 passes scan errors to checkstop logic circuit 120 as well. Scan chain engine 130 controls the actual write and read of data into scan chains 135.

When a checkstop occurs data is in processor registers 105 is transferred to scan chains 135 through the path described supra. If a system checkstop should occur during the transmission of data the S CLK will turn off, halting further data transmission, however the V CLK continues to run. Checkstop logic circuit 120 monitors ongoing scan operations. In the case of a system checkstop, checkstop logic circuit 120, which has monitored all scan commands will take over control and complete the scan chain rotation. While no new data can be added, checkstop logic circuit 120 will clock the data around the scan chain until the data that was written before the system checkstop is in the proper latch of the scan chain.

In FIG. 1, a data path exists from processor registers 105, through millicode interface 110, through checkstop scan controller 115, and through checkstop scan engine 125 to scan chains 125. The data path does not pass through checkstop logic circuit 120. A command path exists between checkstop scan controller 115, through checkstop logic circuit 120, and through checkstop scan engine 125 to scan chain engine 130. All the information needed by checkstop logic circuit 120 to generate new scan commands is contained in the scan commands transmitted by checkstop scan controller 115 before the system checkstop.

Figure 2:
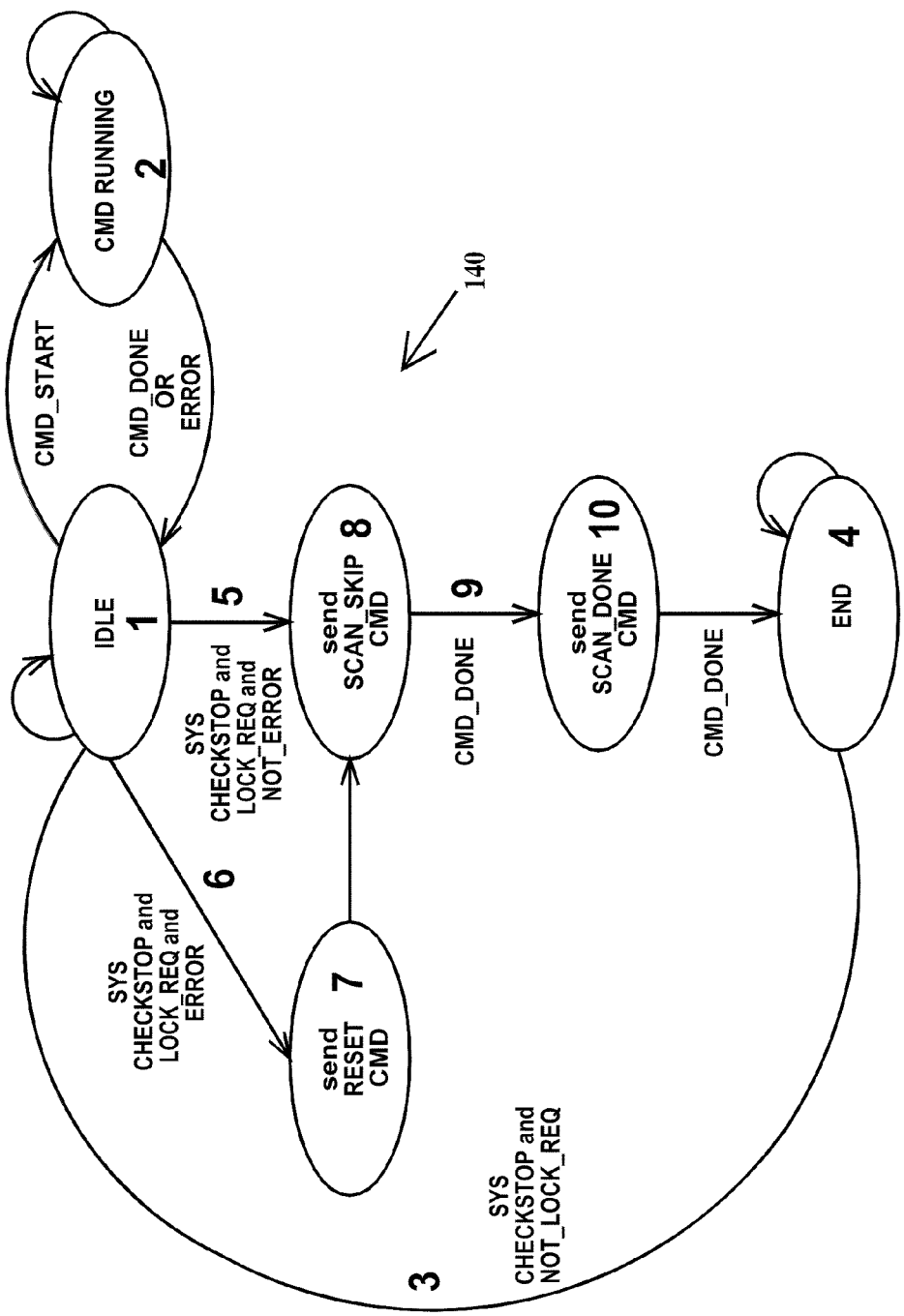
FIG. 2 is a state machine diagram of the checkstop logic illustrated in FIG. 1.

FIG. 2 is a state machine diagram of checkstop logic circuits illustrated in FIG. 1. In FIG. 2, a finite state machine 140 includes an IDLE state, a CMD RUNNING state, a send SCAN_SKIP state, a send SCAN_DONE CMD state, a send REST CMD state and an END state. IDLE state has a transition to the CMD RUNNING state upon a CMD_START condition, a transition to the send SCAN_SKIP CMD state upon a SYS CHECKSTOP and LOCK_REQ and NOT_ERROR condition, a transition to the send RESET CMD upon a SYS CHECKSTOP and LOCK_REQ and ERROR condition, and a transition to the END state upon a SYS CHECKSTOP and NOT_LOCK_REQ condition. The send SCAN_SKIP CMD state has a transition to the send SCAN_DONE CMD state upon a CMD_DONE condition. The send SCAN_DONE CMD state has a transition to the END state upon a CMD_DONE condition. And the send RESET CMD has an automatic transition to the send SCAN_SKIP CMD.

A scan start command (SCAN_START) must be executed first before any other scan command can be executed. The scan start command sets up scan chain selects, tells checkstop scan engine 125 (see FIG. 1) to request a lock (LOCK_REQ) for the scan chains, and sets a scan length decrement register to the total length of the scan chain selected. Once a lock has been granted a fixed N-bit header is scanned into the selected scan chain, where N is a positive integer such 8, 16 etc.

A scan start command must be executed before issuing a scan skip (SCAN_SKIP) command so that the scan chain selects are properly setup and a lock has been obtained.

The scan skip command is used to rotate a scan chain to the proper position to allow reads and/or writes of the data transmitted before the system checkstop occurred. The scan skip command rotates the number of bits indicated in the command. If the scan length zero then the scan kip command will skip to the end of the scan chain using the remaining count in the scan length decrement register.

A scan start command must have been executed before issuing a scan read command (SCAN_READ) so that the domain and scan chain selects are properly setup and a lock has been obtained. The scan read command is used to read anywhere from 1 to M bits of data from the selected scan chain, where M is a positive integer such as 8, 16, 64 etc. The scan read command reads the number of bits indicated by a scan_length vector within the scan read command. If the scan_length is set to 0 then M bits of data are read and returned on a read_data bus.

A scan start command must have been executed before issuing a scan write command (SCAN_WRITE) so that the scan chain selects are properly setup and a lock has been obtained. The scan write command is used to write anywhere from 1 to M bits of data into the selected scan chain. The scan write command writes the number of bits indicated by the scan_length vector in the command. If the scan_length is set to 0 then M bits of data from the command are shifted into the scan chain.

The scan reset command (RESET) resets checkstop scan engine 125 (see FIG. 1) and error log registers after an error has occurred. Examples of errors include, but are not limited to parity errors and latch flip errors.

In the following description of the operation of finite state machine 140, the numbers 1 through 10 in parenthesis correspond to the numbers 1 through 10 in FIG. 2 and indicate the state or transition in FIG. 2 where the activity described occurs. The normal uninterrupted scan operation for reading out processor registers 105 (see FIG. 1) in a checkstopped processor consists of the following command sequence: (1) SCAN_START, (2) one or more SCAN_SKIP, SCAN_READ, SCAN_WRITE commands in any order, (3) SCAN_SKIP to end if scan rotations not already completed, (SCAN_DONE).

Checkstop logic circuit 120 (see FIG. 1) constantly monitors to determine if checkstop scan engine 125 (see FIG. 1) is executing a command (2) CMD RUNNING or if it is waiting for the next command (1) IDLE. Initially checkstop logic circuit 120 is in the IDLE state and goes to the CMD RUNNING state when checkstop scan engine 125 (see FIG. 1) sends a command to the scan chain engine 130 (see FIG. 1). If the command has finished checkstop logic circuit 120 goes back to the IDLE state. Furthermore checkstop logic circuit 120 monitors the LOCK-REQ to determine if a scan sequence is active. LOCK_REQ is set by the SCAN_START command and reset by the SCAN_DONE command.

When a system checkstop (SYS CHECKSTOP) occurs checkstop logic circuit 120 (see FIG. 1) can be either in the CMD RUNNING state (2) or in the IDLE state (1). If checkstop logic circuit 120 is in the CMD RUNNING state, checkstop logic circuit 120 waits until the command ends and checkstop logic circuit 120 returns to the IDLE state (1). When in the IDLE state or when returned to the IDLE state after a system checkstop there are two different responses available to checkstop logic circuit 120 depending on whether or not LOCK_REQ is asserted. If a LOCK_REQ is not asserted no actions is taken because scan chains 135 (see FIG. 1) are not rotated and finite state machine 140 transitions directly (3) to the end state (4). If LOCK_REQ is asserted, checkstop logic circuit 120 tries to finish the current scan chain rotation by one of two transitions (5 or 6) depending upon whether there is an ERROR or NOT-ERROR asserted. If the last scan command encountered an error, ERROR is asserted (6) and checkstop logic circuit 120 sends a RESET CMD (7) to checkstop scan engine 125 (see FIG. 1) to try and clear the error and enable scan operations again. If ERROR-NOT is asserted (5) or if the error was successfully cleared, then checkstop logic circuit 120 sends a SCAN_SKIP command (8) to checkstop scan engine 130. This finishes the rotation of the scan chain and puts the scan chain into its original rotational state.

After the SCAN_SKIP command is completed (9) the checkstop logic circuit 120 (see FIG. 1) sends a SCAN_DONE command (10) to de-assert LOCK_REQ. This re-enables access to the scan chain 135 (see FIG. 1) for a service processor. When processor registers 105 (see FIG. 1) are now scanned out by the service processor the alignment of each latch inside scan chains 135 (see FIG. 1) is correctly aligned again. In one example, the service processor performs analysis of the contents of scan chains 135 (which reflect the state of process registers 105) to try to determine the cause of the checkstop. In one example, the service processor performs diagnosis of the contents of scan chains 135 (which reflect the state of process registers 105) to try recover from the error that caused the checkstop.

FIGS. 3A, 3B and 3C illustrate a sequence of scan rotation according to the embodiments of the present invention. In FIG. 3A, an exemplary scan chain 135A includes 10 latches (or registers) serially arranged from a first latch 145 to a last latch 150. A scan-in is connected first latch 145 and a scan-out is connected to last latch 150. In addition to being able to clock data from the scan-input to the scan-output, data can be scanned from last latch 150 to first latch 145, so scan chain 135A can be also viewed as a ring in which data can be rotated. The numbers 1 through 10 indicate the data bit (not the value) stored in a latch (assumed for exemplary purposes to be a single bit).

In FIG. 3B, in response to a checkstop, four data bits out of X data bits (where X is greater than 4) have been clocked (using scan clocks generated by checkstop scan engine 125, see FIG. 1) into scan chain 135A and then a system checkstop has occurred. The data bit 10 in latch 155 is not the proper data bit that would be in latch 155 if the system checkstop had not occurred and the scan chain fully rotated (clocked 10 times). The proper data bit is data bit 4.

In FIG. 3C, enough additional clocking, six clocks in this example, (using scan clocks generated by checkstop scan engine 125, see FIG. 1) has been performed to restore the correct order of the data bits in the scan chain, where it may be read out to the external service element through the scan-out.

Thus the embodiments of the present invention provide that the correct number of scan commands are applied to ensure that data scanned before a system checkstop is stored in the proper latch of the scan chain (i.e., complete scan rotation) in order allow recovery of the data stored in the process registers as a result of a checkstop.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A processor, comprising:
 a processor register;
 a millicode interface connected between said processor register and a checkstop scan controller;
 a checkstop logic circuit connected between said checkstop scan controller and a checkstop scan engine;
 a scan chain comprising serially connected latches, outputs of previous latches of said scan chain connected to inputs of subsequent latches of said scan chain, an output of a last latch of said scan chain connected to an input of a first latch of said scan chain; and
 a scan chain engine connected between said checkstop scan engine and said scan chain and said scan chain connected to said checkstop scan engine.

2. The processor of claim 1, further including:
 a data path from said processor register, through said millicode interface, through said checkstop scan controller, and through said checkstop scan engine to said scan chain.

3. The processor of claim 2, wherein said data path does not pass through said checkstop logic circuit.

4. The processor of claim 1, further including:
 a command path between said checkstop scan controller, through said checkstop logic circuit, and through said checkstop scan engine to said scan chain engine.

5. The processor of claim 1, wherein said processor registers and said millicode interface are clocked by a first clock and said checkstop scan controller, said checkstop logic circuit, said checkstop scan engine, said scan chain engine and said scan chain are clocked by a second clock different from said first clock.

6. The processor of claim 5, wherein:
 said first and second clocks are synchronous;
 both said first and second clocks are operable during a checkstop; and
 said first clock is not operable during a system checkstop and said second clock is operable during said system checkstop.

7. The processor of claim 1, wherein said checkstop logic circuit is a finite state machine responsive to a system checkstop.

8. The processor of claim 1, wherein said checkstop logic circuit is configured to pass scan commands from said scan controller to said checkstop scan engine during a checkstop but not during a system checkstop.

9. The processor of claim 8, wherein in response to a system checkstop during a checkstop, said checkstop logic circuit is configured to generate and send scan commands to said checkstop scan engine to generate a number of scan clock pulses equal to the number of latches in said scan chain minus the number of scan clock pulses generated by said checkstop scan engine in response to said checkstop before said system checkstop occurred.

10. A method of automatic scan completion in the event of a system checkstop, the method comprising:
 (a) upon occurrence of a checkstop, serially reading data from a processor register and serially writing said data to latches of a scan chain register; and
 (b) upon occurrence of a system checkstop during (a), stopping said reading and writing and moving of data and generating a number of scan clock pulses equal to the number of latches in said scan chain minus the number of scan clock pulses generated by a checkstop scan engine in response to said checkstop before said system checkstop occurred to rotate said data from a last latch of said scan chain to a first latch of said scan chain.

11. The method of claim 10, wherein (b) is performed by a finite state machine embodied in a checkstop logic circuit, said checkstop logic circuit intervening in a scan command path between said processor register and said scan chain, a path of said data from said process register to said scan chain not passing through said checkstop logic circuit.

12. A method, comprising:
providing a processor, said processor comprising:
  a process register;
  a millicode interface connected between said process register and a checkstop scan controller, said checkstop scan controller coupled to checkstop scan engine;
  a scan chain comprising serially connected latches, outputs of previous latches of said scan chain connected to inputs of subsequent latches of said scan chain, an output of a last latch of said scan chain connected to an input of a first latch of said scan chain; and
  a scan chain engine and said scan chain connected to said checkstop scan engine; and
connecting a checkstop logic circuit between said checkstop scan controller and a checkstop scan engine.

13. The method of claim 12, further including:
providing a data path from said process register, through said millicode interface, through said checkstop scan controller, and through said checkstop scan engine to said scan chain.

14. The method of claim 13, wherein said data path does not pass through said checkstop logic circuit.

15. The method of claim 12, further including:
providing a command path between said checkstop scan controller, through said checkstop logic circuit, and through said checkstop scan engine to said scan chain engine.

16. The method of claim 12, further including:
clocking said process register and said millicode interface by a first clock and clocking said checkstop scan controller, said checkstop logic circuit, said checkstop scan engine, said scan chain engine and said scan chain are clocked by a second clock different from said first clock, said first clock synchronous with said second clocks.

17. The method of claim 16, further including:
operating both said first and second clocks during a checkstop; and
stopping said first clock during a system checkstop and operating said second clock during said system checkstop.

18. The method of claim 12, wherein said checkstop logic circuit is a finite state machine responsive to a system checkstop.

19. The method of claim 12, further including:
said checkstop logic circuit passing scan commands from said scan controller to said checkstop scan engine during a checkstop but not during a system checkstop.

20. The method of claim 19, further including:
in response to a system checkstop during a checkstop, said checkstop logic circuit generating and sending scan commands to said checkstop scan engine to generate a number of scan clock pulses equal to the number of latches in said scan chain minus the number of scan clock pulses generated by said checkstop scan engine in response to said checkstop before said system checkstop occurred.

* * * * *